United States Patent
Shirai

(10) Patent No.: US 12,397,790 B2
(45) Date of Patent: Aug. 26, 2025

(54) PLATOON TRAVELING SYSTEM

(71) Applicant: TOYOTA JIDOSHA KABUSHIKI KAISHA, Toyota (JP)

(72) Inventor: Hayato Shirai, Tagata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 18/125,318

(22) Filed: Mar. 23, 2023

(65) Prior Publication Data
US 2023/0347893 A1  Nov. 2, 2023

(30) Foreign Application Priority Data
Apr. 28, 2022 (JP) ................. 2022-074838

(51) Int. Cl.
*B60W 30/165* (2020.01)
(52) U.S. Cl.
CPC ....... *B60W 30/165* (2013.01); *B60W 2520/10* (2013.01); *B60W 2554/404* (2020.02)
(58) Field of Classification Search
CPC ........... B60W 30/165; B60W 2520/10; B60W 2554/404; B60W 30/143; B60W 2530/16
See application file for complete search history.

(56) References Cited

U.S. PATENT DOCUMENTS

| 6,975,931 B2 | 12/2005 | Adachi |
| 10,908,617 B2 | 2/2021 | Kodera et al. |
| 2015/0314771 A1* | 11/2015 | Dextreit ................ B60W 10/08 180/65.265 |
| 2019/0092327 A1* | 3/2019 | Osaki .................... B60W 30/16 |
| 2020/0298851 A1* | 9/2020 | Tanaka ................. B60W 50/14 |
| 2020/0361461 A1* | 11/2020 | Eo ........................ B60K 6/387 |
| 2020/0377102 A1* | 12/2020 | Kuwahara ............ B60W 40/04 |
| 2022/0105934 A1* | 4/2022 | Shieh ................ B60W 40/1005 |

FOREIGN PATENT DOCUMENTS

| JP | 2003-317199 A | 11/2003 |
| JP | 2019-101677 A | 6/2019 |

* cited by examiner

*Primary Examiner* — Aniss Chad
*Assistant Examiner* — Christine Nguyen Huynh
(74) *Attorney, Agent, or Firm* — Oliff PLC

(57) ABSTRACT

A platoon traveling system includes a control device that controls traveling of an own vehicle in adaptive cruise control that adjusts a vehicle speed of the own vehicle in such a manner that following a preceding vehicle at a certain interval is performed. Further, when a preceding vehicle having a high wind-shielding effect is detected on a front side of the own vehicle by a detection device provided in the own vehicle while the own vehicle is traveling alone in the adaptive cruise control, and a vehicle speed of the preceding vehicle is higher than an ACC set vehicle speed set as a vehicle speed in the adaptive cruise control of the own vehicle, the control device proposes to increase the ACC set vehicle speed by a predetermined increase range to a passenger of the own vehicle by using a proposal device provided in the own vehicle.

10 Claims, 6 Drawing Sheets

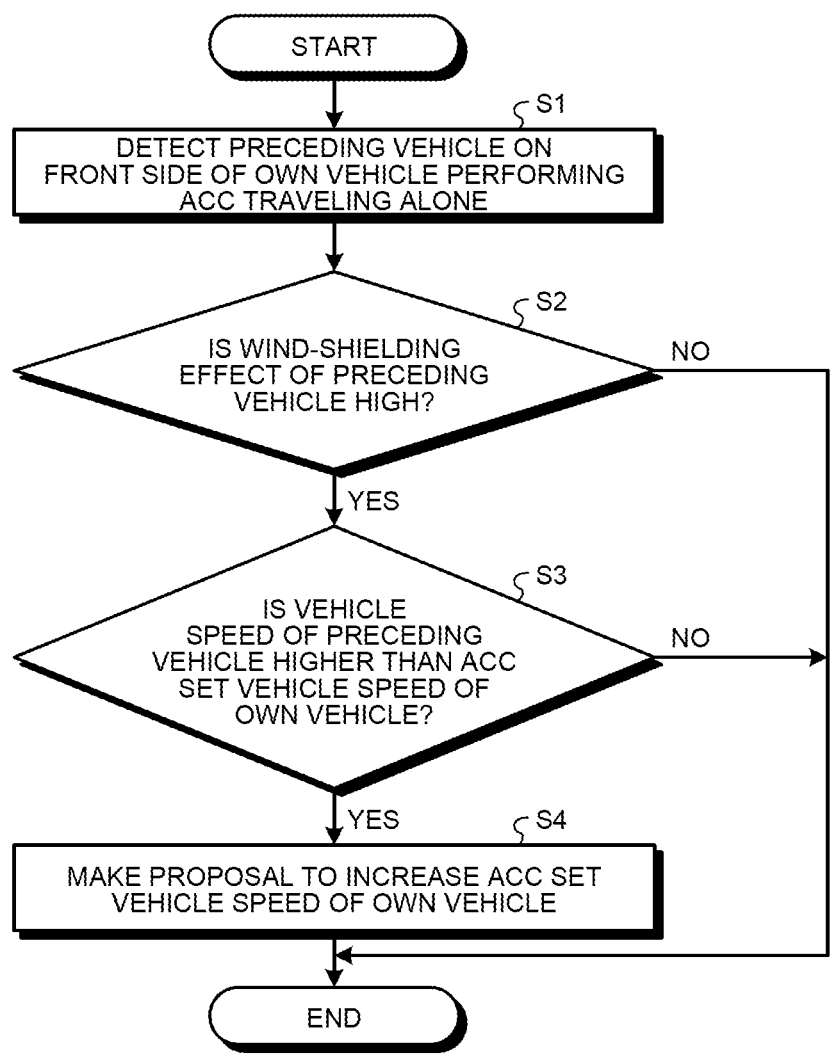

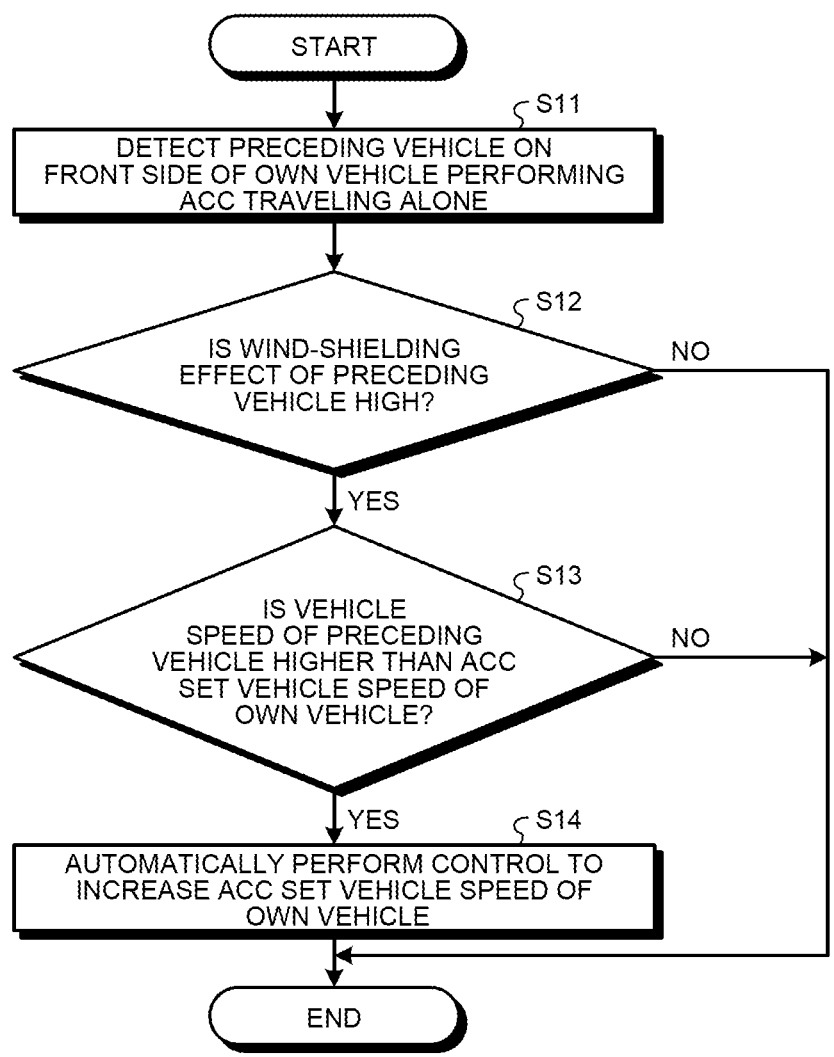

PLATOON TRAVELING SYSTEM

CROSS-REFERENCE TO RELATED APPLICATION(S)

The present application claims priority to and incorporates by reference the entire contents of Japanese Patent Application No. 2022-074838 filed in Japan on Apr. 28, 2022.

BACKGROUND

The present disclosure relates to a platoon traveling system.

Japanese Laid-open Patent Publication No. 2019-101677 discloses a platoon traveling system with which a preceding vehicle and own vehicle can form appropriate platooning order in platoon traveling.

SUMMARY

There is a need for providing a platoon traveling system capable of improving fuel consumption and electricity consumption of the own vehicle as compared with a case where the own vehicle continues to travel alone by the adaptive cruise control.

According to an embodiment, a platoon traveling system includes a control device that controls traveling of an own vehicle in adaptive cruise control that adjusts a vehicle speed of the own vehicle in such a manner that following a preceding vehicle at a certain interval is performed. Further, in a case where a preceding vehicle having a high wind-shielding effect is detected on a front side of the own vehicle by a detection device provided in the own vehicle while the own vehicle is traveling alone in the adaptive cruise control, and a vehicle speed of the preceding vehicle is higher than an ACC set vehicle speed set as a vehicle speed in the adaptive cruise control of the own vehicle, the control device proposes to increase the ACC set vehicle speed by a predetermined increase range to a passenger of the own vehicle by using a proposal device provided in the own vehicle.

According to an embodiment, a platoon traveling system includes a control device that controls traveling of an own vehicle in an adaptive cruise control that adjusts a vehicle speed of the own vehicle in such a manner that following a preceding vehicle at a certain interval is performed. Further, in a case where a preceding vehicle having a high wind-shielding effect is detected on a front side of the own vehicle by a detection device provided in the own vehicle while the own vehicle is traveling alone in the adaptive cruise control, and a vehicle speed of the preceding vehicle is higher than an ACC set vehicle speed set as a vehicle speed in the adaptive cruise control of the own vehicle, the control device automatically executes control to increase the ACC set vehicle speed by a predetermined increase range.

BRIEF DESCRIPTION OF THE DRAWINGS

FIG. 6 is a flowchart illustrating an example of control executed by the ECU in the own vehicle performing ACC traveling alone; and FIG. 7 is a flowchart illustrating another example of control executed by the ECU in the own vehicle performing the ACC traveling alone.

DETAILED DESCRIPTION

In the related art, when an own vehicle continues to travel alone by adaptive cruise control, air resistance due to wind or the like at the time of traveling leads to deterioration in fuel consumption and electricity consumption.

Hereinafter, an embodiment of a platoon traveling system according to the present disclosure will be described. Note that the present disclosure is not limited to the present embodiment. A vehicle that includes the platoon traveling system and that can be a target of the present disclosure is a vehicle that can travel in a manner of following a preceding vehicle without being operated by a driver. Specifically, a configuration is made in such a manner that traveling can be performed while an inter-vehicle distance with the preceding vehicle is maintained to be an appropriate distance with driving force and braking force being controlled without an accelerator operation or brake operation by the driver. Examples of the control capable of performing such follow-up traveling include known cruise control, adaptive cruise control (ACC) that maintains a constant inter-vehicle distance from a preceding vehicle and stops the own vehicle when the preceding vehicle stops, and cooperative adaptive cruise control (CACC) that enables platoon traveling of the own vehicle and the preceding vehicle (including front and rear vehicles) by setting a relatively short inter-vehicle distance between the own vehicle and the preceding vehicle by using vehicle-to-vehicle communication. Note that these kinds of cruise control and the like are executed by, for example, a switch operation by a driver or a passenger, or executed by signals from various sensors.

Figure 1:
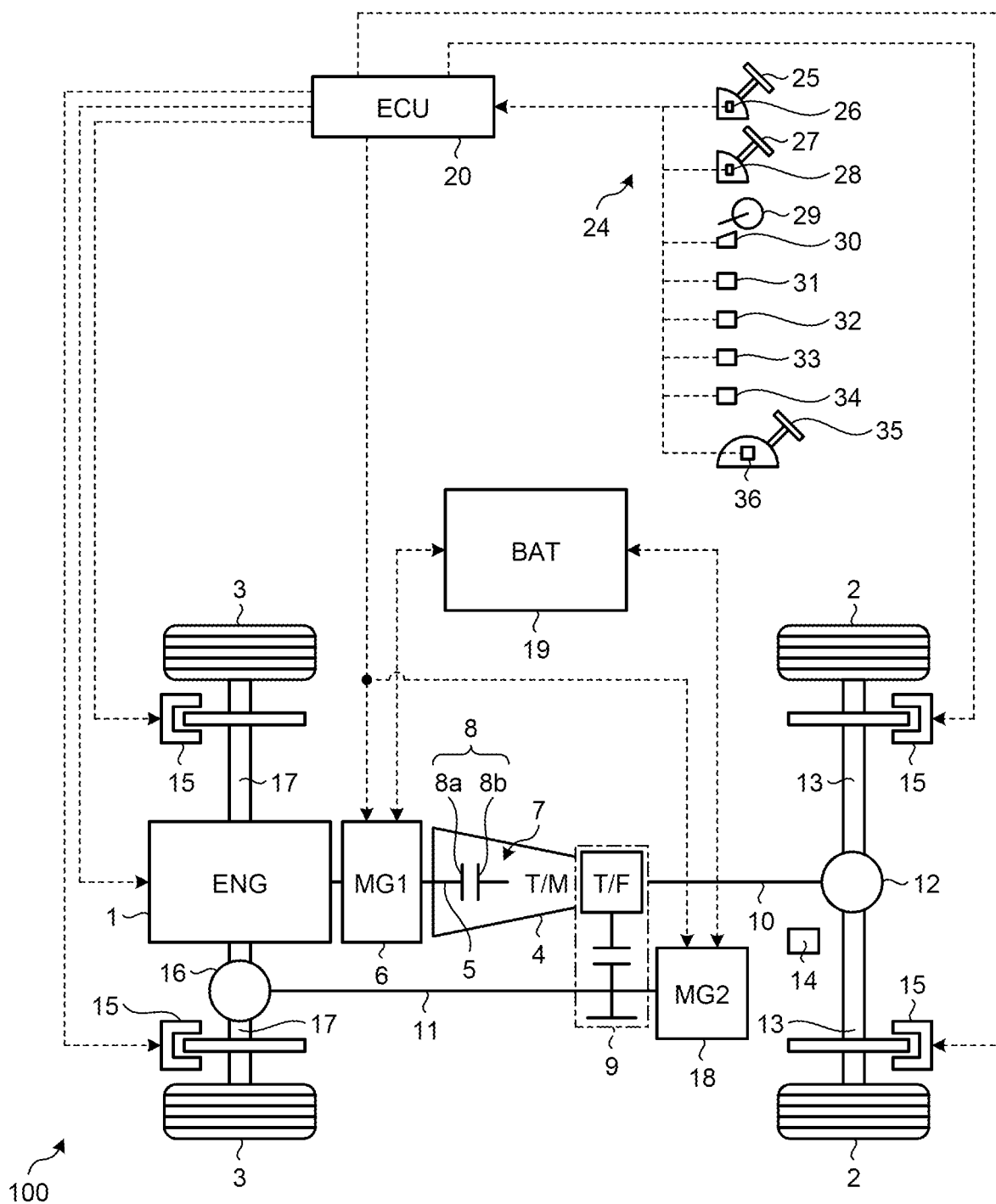
FIG. 1 is a view for describing an example of an own vehicle including a platoon traveling system according to an embodiment.

FIG. 1 is a view for describing an example of an own vehicle 100 including a platoon traveling system according to an embodiment.

As illustrated in FIG. 1, the own vehicle 100 including the platoon traveling system according to the embodiment is an example of a four-wheel-drive vehicle based on a so-called front engine rear drive (FR) vehicle in which an engine 1 is arranged on a front side of the own vehicle 100 and power of the engine 1 is transmitted to rear wheels 2. In addition, the engine 1 is arranged between right and left front wheels 3 (substantially at a center portion in a width direction of a vehicle body) on a side of the front wheels 3 toward a side of the rear wheels 2. Note that the own vehicle 100 may be a four-wheel-drive vehicle based on a so-called front engine front drive (FF) vehicle.

A transmission 4 is arranged on an output side of the engine 1, and an output shaft (not illustrated) of the engine 1 is coupled to an input shaft 5 of the transmission 4. The engine 1 is, for example, an internal combustion engine such as a gasoline engine or a diesel engine, and is configured in such a manner that a throttle opening and a fuel injection amount are controlled according to request driving force such as a pedaling amount of an accelerator pedal (not illustrated) (accelerator opening) and torque corresponding to the request driving force is output. In a case of the gasoline engine, an opening degree of a throttle valve, a supply amount or an injection amount of fuel, execution and stopping of ignition, an ignition timing, and the like are electrically controlled. In a case of the diesel engine, an injection amount of fuel, an injection timing of the fuel, an opening degree of a throttle valve in an exhaust gas recirculation (EGR) system, and the like are electrically controlled.

As illustrated in FIG. 1, the transmission 4 is arranged on the same axis as the engine 1, and transmits torque between the engine 1 and a first motor (MG1) 6 and a driving wheel. This transmission 4 is a mechanism capable of appropriately changing a ratio of an input rotation speed to an output rotation speed, and can include a stepped transmission, a continuously-variable transmission capable of continuously changing a transmission ratio, or the like. More preferably, the transmission 4 includes a clutch mechanism 7 capable of transmitting torque by engagement, and cutting off transmission of the torque by disengagement and setting a neutral state.

The clutch mechanism 7 selectively transmits and cuts off power between the engine 1 (and the first motor 6) and the driving wheel. In the example illustrated in FIG. 1, the clutch mechanism 7 is provided in the transmission 4 in the above-described manner. Specifically, the clutch mechanism 7 includes a friction plate 8 (8a) coupled to a rotary member (not illustrated) on a side of the engine 1 and a friction plate 8 (8b) coupled to a rotary member (not illustrated) on a side of the rear wheels 2. Although not illustrated in FIG. 1, the clutch mechanism 7 may include, for example, a multi-disc clutch which includes a plurality of friction plates on one side and a plurality of friction plates on the other side, and in which the plurality of friction plates on the one side and the plurality of friction plates on the other side are alternately arranged. In addition, in the own vehicle 100 according to the embodiment, the clutch mechanism 7 is not limited to the clutch mechanism incorporated in the transmission 4 in a manner illustrated in FIG. 1, and may be, for example, a friction clutch provided as a start clutch between the first motor 6 and the transmission 4. In any case, by disengagement of the clutch mechanism 7, the engine 1 and the first motor 6 are disconnected from a drive system of the own vehicle 100. Furthermore, by the engagement of the clutch mechanism 7, the engine 1 and the first motor 6 are coupled to the drive system of the own vehicle 100.

The engine 1 and the transmission 4 are arranged on the same axis as described above, and the first motor 6 is arranged between the engine 1 and the transmission 4. The first motor 6 has a function as a generator that generates electricity by being driven by reception of engine torque output from the engine 1 (power generation function), and also has a function as an electric motor that is driven by being supplied with electric power and outputs motor torque (electric motor function). That is, the first motor 6 is a motor having a power generation function (so-called motor generator), and includes, for example, a permanent magnet synchronous motor, an induction motor, or the like. Note that the first motor 6 may be directly coupled to the output shaft of the engine 1 or the input shaft 5 of the transmission 4, or may be coupled to the output shaft of the engine 1 or the input shaft 5 of the transmission 4 via an appropriate transmission mechanism.

A four-wheel-drive transfer 9 is arranged on an output side of the transmission 4. The transfer 9 is a mechanism that distributes the power output from the engine 1 or the torque output from the transmission 4 to the side of the rear wheels 2 and the side of the front wheels 3. A rear propeller shaft 10 is coupled to a member that outputs torque to the side of the rear wheels 2 (not illustrated), and a front propeller shaft 11 is coupled to a member that outputs torque to the side of the front wheels 3 (not illustrated).

The transfer 9 can include a winding transmission mechanism using a chain or a belt, or a gear mechanism. In addition, the transfer 9 can include a full-time four-wheel-drive mechanism including a differential mechanism that enables a differential rotation between the front wheels 3 and the rear wheels 2 and a differential limiting mechanism that limits the differential rotation with a friction clutch or the like, a part-time four-wheel-drive mechanism that selectively cuts off transmission of torque to the side of the front wheels 3, or the like.

The rear propeller shaft 10 extends from the transmission 4 or the transfer 9 to the rear side of the own vehicle 100, and is coupled to a rear differential gear 12. The rear differential gear 12 is a final reduction gear that transmits torque to the right and left rear wheels 2, and the rear wheels 2 are coupled to the rear differential gear 12 via two drive shafts 13 extending in a vehicle width direction. The rear wheels 2 are configured in such a manner that a steering angle thereof is changed by a steering device 14. That is, the right and left rear wheels 2 also function as steering wheels. Furthermore, in the own vehicle 100 illustrated in FIG. 1, a braking device (brake) 15 to apply braking force to each of the rear wheels 2 and the front wheels 3 is coupled. Furthermore, the front propeller shaft 11 extends toward the front side of the own vehicle 100 and is coupled to a front differential gear 16. Note that the front differential gear 16 is a final reduction gear that transmits torque to the right and left front wheels 3, and the front wheels 3 are coupled to the front differential gear 16 via two drive shafts 17 extending in the vehicle width direction.

In addition, a second motor (MG2) 18 that drives the front propeller shaft 11 is coupled to the transfer 9. The second motor 18 is a motor that mainly outputs driving torque for traveling. Note that in order to perform energy regeneration at the time of deceleration, the second motor 18 preferably includes a motor generator having a power generation function, such as a permanent magnet synchronous motor similarly to the first motor 6 described above.

The first motor 6 and the second motor 18 are electrically connected to an electric storage device (BAT) 19 such as a storage battery or a capacitor via an inverter (not illustrated). Thus, it is possible to cause the first motor 6 and the second motor 18 to function as motors by electric power of the electric storage device 19, or to charge electric power generated by the motors 6 and 18 into the electric storage device 19. In addition, it is also possible to cause the second motor 18 to function as an electric motor by the electric power generated by the first motor 6, and to perform traveling by the torque of the second motor 18.

In addition, the own vehicle 100 according to the embodiment can travel in a plurality of traveling modes by controlling each of the engine 1, the first motor 6, the second motor 18, and the clutch mechanism 7. That is, the own vehicle 100 travels by setting any of an EV traveling mode in which the motor torque output from the second motor 18 is transmitted to the drive wheel and the driving force is generated in a state in which the engine 1 is stopped, a series HV traveling mode in which the engine 1 is operated in a state in which the clutch mechanism 7 is disengaged, the first motor 6 is caused to generate the power by being driven by the engine torque, and the motor torque of the second motor 18 is transmitted to the drive wheel and the driving force is generated, or a parallel HV traveling mode in which the engine 1 is operated in a state in which the clutch mechanism 7 is engaged, and the driving force is generated by transmission of the engine torque and the motor torque of the second motor 18 to the driving wheel. Such switching of the traveling modes is set by utilization of a mode switching map or the like using the request driving force and the vehicle speed as parameters, for example. Note that the own vehicle 100 according to the embodiment can be also switched between a four-wheel-drive mode (4WD) and a two-wheel-drive mode (2WD), and such switching of the traveling modes may be controlled, for example, by operation of a mode switching switch by the driver or on the basis of a friction coefficient of a road surface or the like.

Then, an electronic control unit (ECU) 20 that controls the engine 1, the transmission 4, the clutch mechanism 7, the transfer 9, the motors 6 and 18, and the like are provided in the own vehicle 100. The ECU 20 mainly includes a microcomputer, and performs calculation by using input data, and data and a program stored in advance, and to output a result of the calculation as a control command signal.

Figure 2:
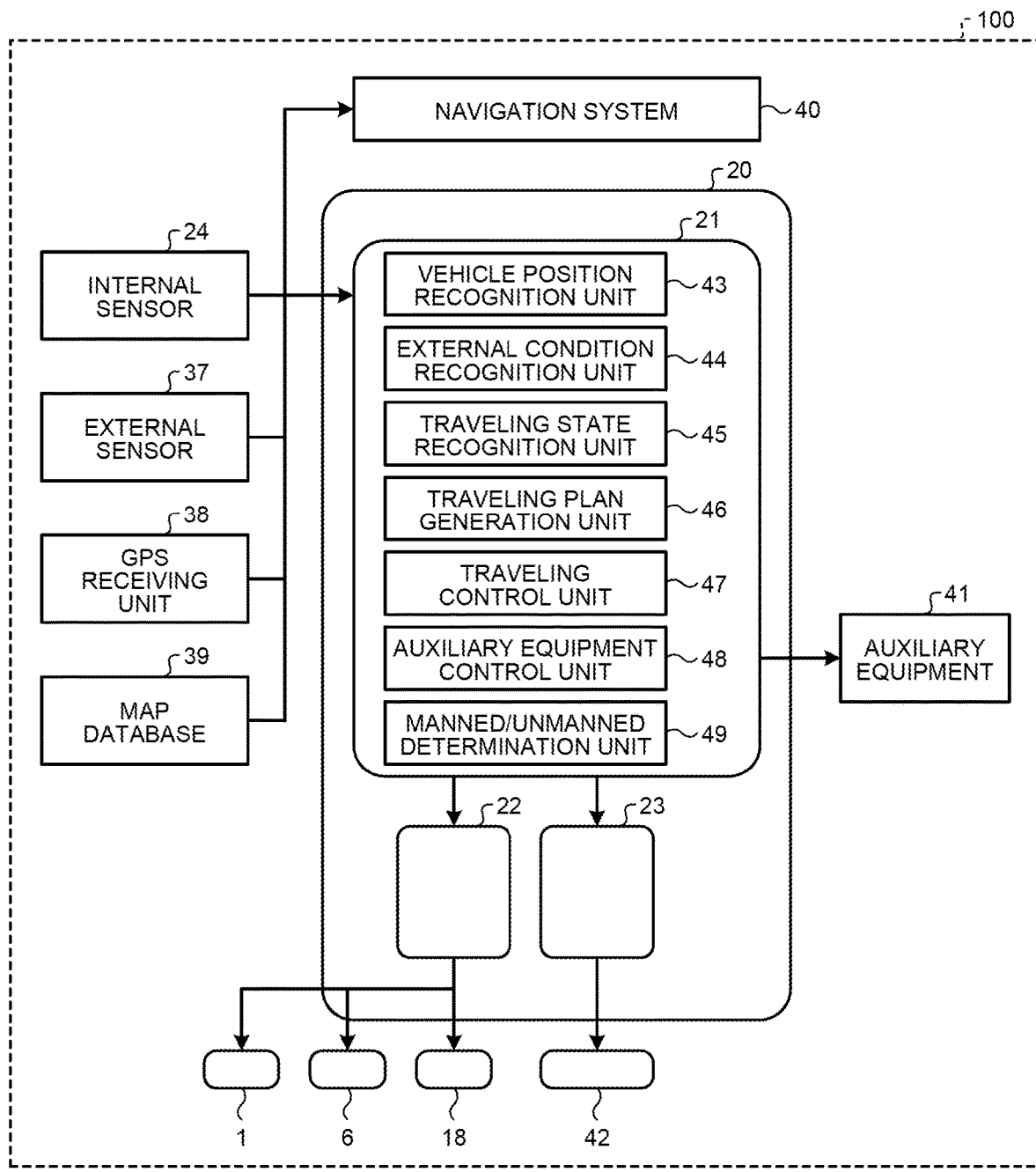
FIG. 2 is a view illustrating an example of a system configuration of an ECU.

FIG. 2 is a view illustrating an example of a system configuration of the ECU 20.

As illustrated in FIG. 2, the ECU 20 includes a main controller 21, and a driving controller 22 and a sub-controller 23 to which a signal output from the main controller 21 is input and which convert the input signal. The driving controller 22 outputs a signal to a throttle actuator provided in the engine 1, an inverter (not illustrated) provided in each of the motors 6 and 18, and the like. The sub-controller 23 outputs signals to actuators provided in various devices such as the clutch mechanism 7.

The main controller 21 mainly includes a microcomputer, and signals are input thereto from main internal sensors 24 that detect a traveling state of the own vehicle 100, and a working state, a behavior, and the like of each unit. The internal sensors 24 are, for example, an accelerator sensor 26 that detects a pedaling amount of an accelerator pedal 25, a brake sensor (or brake switch) 28 that detects a pedaling amount of a brake pedal 27, a steering angle sensor 30 that detects a steering angle of a steering 29, a vehicle speed sensor 31 that detects a rotational speed of each of the rear wheels 2 and the front wheels 3, a longitudinal acceleration sensor 32 that detects longitudinal acceleration of the own vehicle 100, a lateral acceleration sensor 33 that detects lateral acceleration of the own vehicle 100, a yaw rate sensor 34 that detects a yaw rate of the own vehicle 100, a shift sensor 36 that detects a position of a shift lever (or shift switch) 35, and the like. A signal for controlling the engine 1 and each of the motors 6 and 18 is output to the driving controller 22, and a signal for controlling the clutch mechanism 7 and the like is output to the sub-controller 23 on the basis of the signals input from the internal sensors 24, an arithmetic expression or a map stored in advance, or the like. Note that as examples of the input or output signals, the signals input from the internal sensors 24 to the ECU 20 and signals output from the ECU 20 to the engine 1, the motors 6 and 18, and the braking device 15 are indicated by broken lines in FIG. 1.

Furthermore, the own vehicle 100 to be controlled in the embodiment can perform automatic driving in which the driving operation of the own vehicle 100 is automatically controlled to travel. The automatic driving defined in the embodiment is automatic driving in which a control system of the own vehicle 100 performs all driving operations such as recognition of a traveling environment, monitoring of a peripheral condition, start/acceleration, steering, and braking/stopping. For example, advanced automatic driving or fully automatic driving corresponding to a "level 4" in an automation level formulated by National Highway Traffic Safety Administration (NHTSA) or a "level 4" and a "level 5" in an automation level formulated by Society of Automotive Engineers (SAE) of the United States is performed. Thus, the own vehicle 100 to be controlled in the embodiment can travel by the automatic driving even in a condition in which there is no passenger (such as a driver, fellow passenger, or occupant) in the vehicle. That is, the own vehicle 100 can perform manned automatic driving in which traveling is performed by the automatic driving in a state in which a passenger is present in the vehicle, and unmanned automatic driving in which traveling is performed by the automatic driving in a state in which no passenger is present in the vehicle. Note that the own vehicle 100 may be configured to be able to select, for example, an automatic driving mode in which traveling is performed by the automatic driving and a manual driving mode in which the driver performs the driving operation of the own vehicle 100 as defined in the "level 4" in the automation level of the SAE.

Thus, the own vehicle 100 can perform so-called automatic driving traveling in which traveling is performed by automatic controlling of the motors 6 and 18, the braking device 15, or the steering device 14 without the driving operation by the passenger (person). The ECU 20 also controls the motors 6 and 18, the steering device 14, the braking device 15, and the like at the time of such automatic driving traveling.

Signals are input to the main controller 21 from main external sensors 37 that detect peripheral information and an external condition of the own vehicle 100 in addition to the internal sensors 24 in order to perform the automatic driving traveling. The external sensor 37 is, for example, an in-vehicle camera, radio detection and ranging (RADAR), laser imaging detection and ranging (LIDAR), vehicle-to-vehicle communication, and the like.

For example, the in-vehicle camera is installed inside a windshield of the own vehicle 100, and transmits imaging information related to the external condition of the own vehicle 100 to the main controller 21. The in-vehicle camera may be a monocular camera or a stereo camera. The stereo camera includes a plurality of imaging units arranged to reproduce binocular parallax. According to the imaging information of the stereo camera, information in a depth direction on a front side of the vehicle can also be acquired.

The RADAR detects another vehicle, an obstacle, and the like outside the own vehicle 100 by using radio waves such as a millimeter wave and a microwave, and to transmit detection data thereof to the main controller 21. For example, radio waves are emitted to the surroundings of the own vehicle 100, and the radio waves reflected by another vehicle, an obstacle, and the like are received and measured/analyzed, whereby the other vehicle, the obstacle, and the like are detected.

The LIDAR detects another vehicle, an obstacle, and the like outside the own vehicle 100 by using laser light, and transmit detection data thereof to the main controller 21. For example, laser light is emitted to the surroundings of the own vehicle 100, and the laser light reflected by another vehicle, an obstacle, and the like is received and measured/analyzed, whereby the other vehicle, the obstacle, and the like are detected.

The vehicle-to-vehicle communication (inter-vehicle communication) is a system that acquires information (such as a destination, a position, a speed, a traveling direction, vehicle control information, and the like) of a surrounding vehicle by wireless communication between the vehicles, and provides safe driving support to the driver and the passenger as necessary. Furthermore, in this vehicle-to-vehicle communication, a service can be received by an information exchange between vehicles on which in-vehicle devices of an Intelligent Transport Systems (ITS) safe driving support wireless system are mounted, and the service can be received at an unspecified place where infrastructure facilities are not provided. Thus, the service can be received even in a place where installation of the infrastructure facilities is difficult.

Signals are input to the main controller 21 from a global positioning system (GPS) receiving unit 38, a map database 39, a navigation system 40, and the like in addition to the internal sensors 24 and the external sensors 37 described above. The GPS receiving unit 38 measures a position of the own vehicle 100 (such as latitude and longitude of the own vehicle 100) by receiving radio waves from a plurality of GPS satellites, and to transmit the position information to the main controller 21. The map database 39 is a database in which map information is accumulated, and data stored in a computer of an external facility such as an information processing center that can communicate with the own vehicle 100 can be used, for example. Note that the above-described computer of the external facility includes the above-described vehicle-to-vehicle communication, road-to-vehicle communication between the own vehicle 100 and communication equipment, a sign post, or the like installed outside on a road or beside the road, so-called big data accumulated in a server (not illustrated) such as an external data center and updated as needed, and the like. Furthermore, the map database 39 may be stored inside the main controller 21. The navigation system 40 calculates a traveling route of the own vehicle 100 on the basis of the position information of the own vehicle 100 which information is measured by the GPS receiving unit 38, and the map information in the map database 39.

The main controller 21 performs calculation by using the detection data and the information data input from the internal sensors 24, the external sensors 37, and the like, data stored in advance, and the like, and outputs signals to the driving controller 22, the sub-controller 23, and auxiliary equipment 41 on the basis of a result of the calculation. Then, the driving controller 22 outputs control command signals to the engine 1 (including the throttle valve) and the actuators of the motors 6 and 18, and the sub-controller 23 outputs a control command signal to the actuator of each unit of the own vehicle 100, such as the braking device 15 and the steering device 14. Note that the actuators may be simply referred to as actuators 42 without being distinguished in the following description.

A brake actuator, a steering actuator, and the like are included as the main actuators 42 for causing the own vehicle 100 to perform the automatic driving traveling. The brake actuator makes the braking device 15 work in response to a control signal output from the sub-controller 23 and to control braking force applied to the rear wheels 2 and the front wheels 3. The steering actuator controls steering torque by driving an assist motor of an electric power steering device according to a control signal output from the sub-controller 23.

The auxiliary equipment 41 is equipment or a device that is not included in the actuators 42, and is, for example, the equipment/device that is not directly involved in the driving operation of the own vehicle 100, examples thereof including a wiper, a headlight, a direction indicator, an air conditioner, and an audio device.

The main controller 21 includes, as main control units to cause the own vehicle 100 perform the automatic driving traveling, a vehicle position recognition unit 43, an external condition recognition unit 44, a traveling state recognition unit 45, a traveling plan generation unit 46, a traveling control unit 47, an auxiliary equipment control unit 48, a manned/unmanned determination unit 49, and the like, for example.

The vehicle position recognition unit 43 recognizes a position of the own vehicle 100 on the map on the basis of the position information of the own vehicle 100 which information is received by the GPS receiving unit 38, and the map information in the map database 39. Note that the position of the own vehicle 100 which position is used in the navigation system 40 can be also acquired from the navigation system 40. Alternatively, in a case where the position of the own vehicle 100 can be measured by a sensor installed outside on the road or the road side, the position of the own vehicle 100 can be acquired by communication with the sensor.

The external condition recognition unit 44 recognizes the external condition of the own vehicle 100 on the basis of, for example, the imaging information of the in-vehicle camera or the detection data of the RADAR or the LIDAR. As the external condition, for example, a position of a traveling lane, a road width, a shape of a road, a road surface grade, information related to an obstacle around the vehicle, and the like are acquired. In addition, as a traveling environment, a periphery of the own vehicle 100, topography/weather information of a traveling route, a road shape, a friction coefficient of the road surface, and the like may be acquired.

The traveling state recognition unit 45 recognizes the travel state of the own vehicle 100 on the basis of various kinds of detection data of the internal sensors 24. As the traveling state of the own vehicle 100, for example, a vehicle speed, longitudinal acceleration, lateral acceleration, a yaw rate, and the like are acquired.

The traveling plan generation unit 46 generates a course of the own vehicle 100 on the basis of, for example, a target route calculated by the navigation system 40, the position of the own vehicle 100 which position is recognized by the vehicle position recognition unit 43, the external condition recognized by the external condition recognition unit 44, and the like. The course is a track in which the own vehicle 100 moves along the target route. In addition, the traveling plan generation unit 46 generates the course in such a manner that the own vehicle 100 can appropriately travel on the target route according to standards such as traveling safely, traveling in compliance with laws and regulations, and traveling efficiently.

Then, the traveling plan generation unit 46 generates a traveling plan corresponding to the generated course. Specifically, the traveling plan along the preset target route is generated on the basis of at least the external condition recognized by the external condition recognition unit 44 and the map information in the map database 39.

The traveling plan is to previously set a traveling state of the own vehicle 100 which state includes a future driving force request of the own vehicle 100, and is generated on the basis of, for example, future data at a several seconds after current time. Depending on the external condition or traveling condition of the own vehicle 100, future data at several ten seconds after the current time can be also used. The traveling plan is output from the traveling plan generation unit 46 as data indicating changes in the vehicle speed, the acceleration, the steering torque, and the like when the own vehicle 100 travels in the course along the target route, for example.

Furthermore, the traveling plan can also be output from the traveling plan generation unit 46 as a speed pattern, an acceleration pattern, and a steering pattern of the own vehicle 100. The speed pattern is, for example, data including a target vehicle speed set in association with time for each target control position with respect to target control positions set at predetermined intervals on the course. The acceleration pattern is, for example, data including target acceleration set in association with time for each target control position with respect to the target control positions set at the predetermined intervals on the course. The steering pattern is, for example, data including target steering torque set in association with time for each target control position with respect to the target control positions set at the predetermined intervals on the course.

Furthermore, the traveling plan includes a traveling plan in which the own vehicle 100 follows a preceding vehicle, and examples thereof include known cruise control and adaptive cruise control (ACC), and cooperative adaptive cruise control (CACC) in which follow-up control is performed by vehicle-to-vehicle communication. Switching of the cruise control and the like is performed by an input operation switch group attached to a side of a steering wheel or to a steering pad, and activation and stopping of the system, switching of control modes, an input of a set vehicle speed, setting of a target inter-vehicle distance (set in three stages of long, medium, and short, for example), and the like are performed.

The traveling control unit 47 automatically controls the traveling of the own vehicle 100 on the basis of the traveling plan generated by the traveling plan generation unit 46. Specifically, a control signal corresponding to the traveling plan is output to the engine 1, the motors 6 and 18, or the actuator 42 via the driving controller 22 and the sub-controller 23. As a result, the own vehicle 100 performs the automatic driving traveling.

The auxiliary equipment control unit 48 automatically control the auxiliary equipment 41 on the basis of the traveling plan generated by the traveling plan generation unit 46. Specifically, a control signal corresponding to the traveling plan is output to the auxiliary equipment 41 such as the wiper, the headlight, the direction indicator, the air conditioner, and the audio device as necessary.

The manned/unmanned determination unit 49 determines whether a passenger is present in the own vehicle 100 and the preceding vehicle. Specifically, in the own vehicle 100, the presence or absence of the passenger is determined on the basis of an operation condition or a working state of a device provided in a vehicle interior, for example, in a case where a power switch, an ignition key switch, or a start button switch is operated to be ON, in a case where a seat occupancy sensor detects that a person is on a seat, in a case where a seat belt wearing sensor detects that a seat belt is worn, or in a case where a steering wheel is operated. In addition, a biological sensor or a moving object detection sensor such as an infrared sensor or a Doppler sensor may be provided and it may be determined whether the passenger is present in the vehicle by detection of a body temperature or a motion of the passenger. Note that in the preceding vehicle, information of the preceding vehicle is acquired by wireless communication by the above-described vehicle-to-vehicle communication, or presence or absence of a passenger of the preceding vehicle is determined by an in-vehicle camera or the like in the own vehicle 100.

As described above, the own vehicle 100 illustrated in FIG. 1 can travel by so-called automatic driving. In the automatic driving, as described above, the vehicles transmit and receive vehicle information such as positions and speeds of each other by the vehicle-to-vehicle communication or the like, and the own vehicle and the preceding vehicle or a following vehicle can perform the platoon traveling by using the information. Note that the platoon traveling means a mode in which a plurality of vehicles travels in a group while maintaining relative positions with each other.

Figure 3:
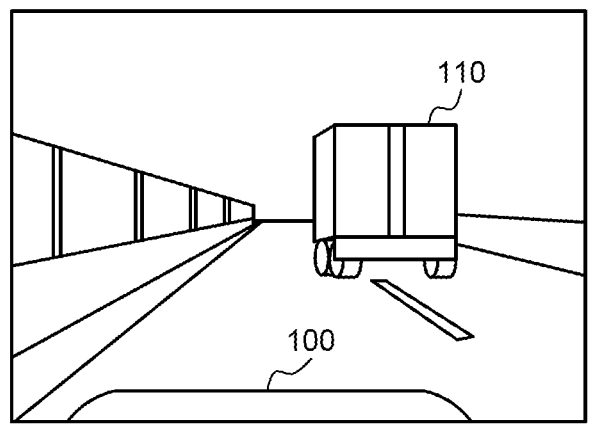
FIG. 3 is a view illustrating a condition in which a preceding vehicle having a high wind-shielding effect enters to a front side of the own vehicle.

In the platoon traveling system according to the embodiment, in the automatic driving in which the traveling is executed under the adaptive cruise control (hereinafter, referred to as ACC traveling), in a case where the own vehicle 100 performs the ACC traveling alone without detecting a preceding vehicle, for example, when a preceding vehicle 110 having a high wind-shielding effect, such as a truck that enters to a front side of the own vehicle 100 is detected as illustrated in FIG. 3, the own vehicle 100 follows the preceding vehicle 110 and performs the platoon traveling. As a result, as compared with a case where the own vehicle 100 continues to travel alone during the ACC traveling, it is possible to reduce traveling resistance (such as air resistance) by the wind-shielding effect by shifting to the platoon traveling with the preceding vehicle 110 having the high wind-shielding effect because of a back surface area (projected area viewed from the back), a vehicle shape, and stable traveling, and to improve fuel consumption and electricity consumption of the own vehicle 100.

Note that it is detected whether there is a preceding vehicle on the front side of the own vehicle 100 by utilization of a millimeter wave radar, an in-vehicle camera, or the like (within a range that can be detected by the millimeter wave radar or the in-vehicle camera, such as the inter-vehicle distance being 100 to 150 m).

In addition, the ECU 20 determines whether the preceding vehicle has the high wind-shielding effect by, for example, capturing an image of the preceding vehicle from the back with the in-vehicle camera or the like of the own vehicle 100, calculating the projected area of the preceding vehicle on the basis of the captured image, and determining that the preceding vehicle has the high wind-shielding effect in a case where the projected area is equal to or larger than a predetermined value. In addition, a target of the detection and determination of the preceding vehicle having the high wind-shielding effect is not limited to the preceding vehicle 110 that enters to the front side of (in front of) the own vehicle 100 in the same lane as the own vehicle 100 from a lane different from the lane in which the own vehicle 100 travels as illustrated in FIG. 3. For example, a preceding vehicle that is present on the front side (in front or diagonally in front) of the own vehicle 100 when the own vehicle 100 catches up therewith to a certain detectable distance, a preceding vehicle that overtakes the own vehicle 100 and is present on the front side (diagonally in front) of the own vehicle 100, or the like may be detected, and it may be determined whether the detected preceding vehicle is a preceding vehicle having a high wind-shielding effect. Then, the own vehicle 100 may perform the platoon traveling by following the preceding vehicle determined to have the high wind-shielding effect.

Figure 4:
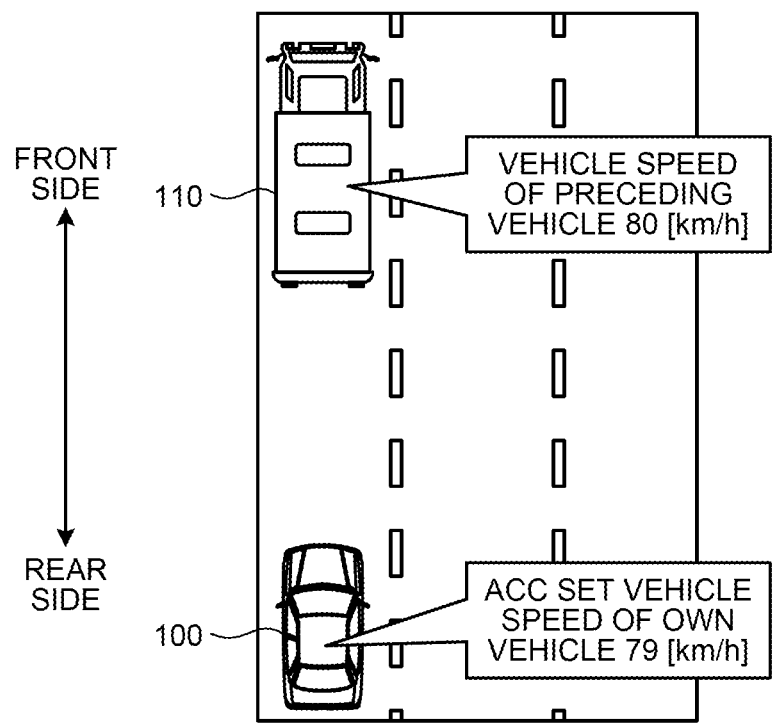
FIG. 4 is a view illustrating a case where the preceding vehicle is faster than an ACC set vehicle speed of the own vehicle.

Then, in the platoon traveling system according to the embodiment, when the preceding vehicle 110 having the high wind-shielding effect and the own vehicle 100 perform the platoon traveling, as illustrated in FIG. 4, in a case where the vehicle speed of the preceding vehicle 110 (80 km/h) is higher than an ACC set vehicle speed of the own vehicle 100 (79 km/h), in other words, in a case where a relative speed between the own vehicle 100 and the preceding vehicle 110 is on a side on which the own vehicle 100 becomes far from the preceding vehicle 110, the ECU 20 presents a proposal for increasing the ACC set vehicle speed of the own vehicle 100 by a predetermined increase range, for example, by using an information panel or the like that is a proposal device provided in the vehicle of the own vehicle 100 and executes control performed on the driver (passenger). Then, the driver (passenger) gives permission to increase the ACC set vehicle speed from, for example, an operation panel or the like in the vehicle in response to the proposal, whereby the ECU 20 can execute the ACC traveling at the ACC set vehicle speed increased by the predetermined increase range. As a result, it is possible to prevent the own vehicle 100 from being separated from the preceding vehicle 110 and to shift to the platoon traveling, and it is possible to improve the fuel consumption and electricity consumption of the own vehicle 100 by the wind-shielding effect.

Figure 5:
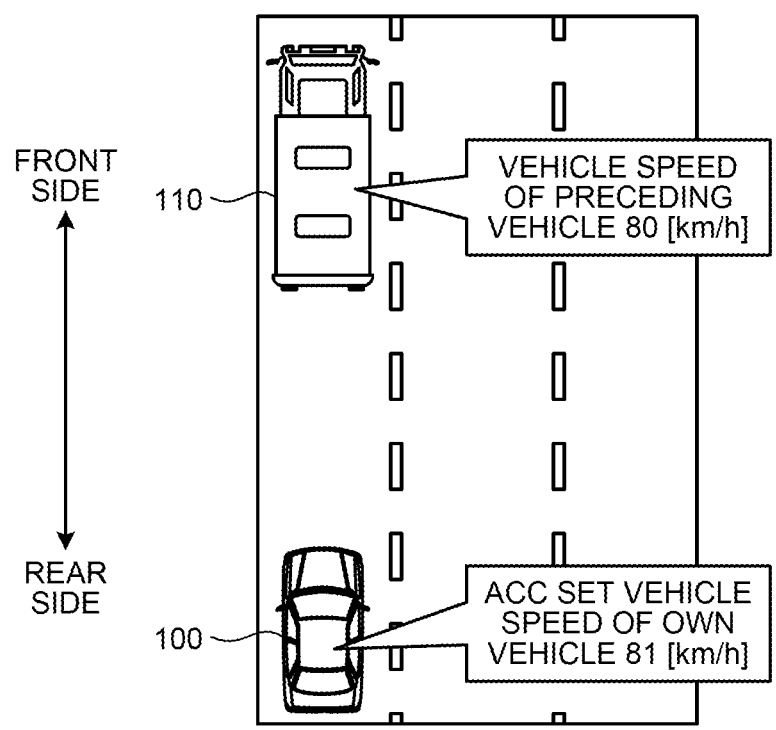
FIG. 5 is a view illustrating a case where the preceding vehicle is slower than the ACC set vehicle speed of the own vehicle.

On the other hand, as illustrated in FIG. 5, in a case where the vehicle speed of the preceding vehicle 110 (80 km/h) is lower than the ACC set vehicle speed (81 km/h) of the own vehicle 100, in other words, in a case where the relative speed between the own vehicle 100 and the preceding vehicle 110 is on a side on which the own vehicle 100 becomes close to the preceding vehicle 110, the ECU 20 does not change the ACC set vehicle speed of the own vehicle 100.

FIG. 6 is a flowchart illustrating an example of control executed by the ECU 20 in the own vehicle 100 that is performing the ACC traveling alone.

First, the ECU 20 detects the preceding vehicle 110 on the front side of the own vehicle 100 performing the ACC traveling alone (Step S1). Then, the ECU 20 determines whether the wind-shielding effect of the preceding vehicle 110 is high (Step S2). In a case of determining that the wind-shielding effect of the preceding vehicle 110 is low (No in Step S2), the ECU 20 ends the series of control without proposing to change the ACC set vehicle speed. On the other hand, in a case of determining that the wind-shielding effect of the preceding vehicle 110 is high (Yes in Step S2), the ECU 20 determines whether the vehicle speed of the preceding vehicle 110 is higher than the ACC set vehicle speed of the own vehicle 100 (Step S3). In a case of determining that the vehicle speed of the preceding vehicle 110 is not higher than the ACC set vehicle speed of the own vehicle 100 (equal to or lower than the ACC set vehicle speed) (No in Step S3), the ECU 20 ends a series of control without proposing to change the ACC set vehicle speed. On the other hand, in a case of determining that the vehicle speed of the preceding vehicle 110 is higher than the ACC set vehicle speed of the own vehicle 100 (Yes in Step S3), the ECU 20 proposes to increase the ACC set vehicle speed of the own vehicle 100 (Step S4). Then, the ECU 20 ends the series of control.

In addition, in the own vehicle 100 according to the embodiment, in a case where the preceding vehicle 110 having the high wind-shielding effect is located on the front side of the own vehicle 100 during the ACC traveling, and the vehicle speed of the preceding vehicle 110 is higher than the ACC set vehicle speed of the own vehicle 100, the ECU 20 may automatically perform control to increase the ACC set vehicle speed of the own vehicle 100. In a case where the ECU 20 automatically changes the ACC set vehicle speed of the own vehicle 100 in such a manner, it is preferable to perform presentation thereof on an information panel or the like in the vehicle and causes the driver (passenger) to recognize the change, for example.

FIG. 7 is a flowchart illustrating another example of control executed by the ECU 20 in the own vehicle 100 performing the ACC traveling alone.

First, the ECU 20 detects the preceding vehicle 110 on the front side of the own vehicle 100 performing the ACC traveling alone (Step S11). Then, the ECU 20 determines whether the wind-shielding effect of the preceding vehicle 110 is high (Step S12). In a case of determining that the wind-shielding effect of the preceding vehicle 110 is low (No in Step S12), the ECU 20 ends the series of control without changing the ACC set vehicle speed. On the other hand, in a case of determining that the wind-shielding effect of the preceding vehicle 110 is high (Yes in Step S12), the ECU 20 determines whether the vehicle speed of the preceding vehicle 110 is higher than the ACC set vehicle speed of the own vehicle 100 (Step S13). In a case of determining that the vehicle speed of the preceding vehicle 110 is not higher than the ACC set vehicle speed of the own vehicle 100 (equal to or lower than the ACC set vehicle speed) (No in Step S13), the ECU 20 ends the series of control without changing the ACC set vehicle speed. On the other hand, in a case of determining that the vehicle speed of the preceding vehicle 110 is higher than the ACC set vehicle speed of the own vehicle 100 (Yes in Step S13), the ECU 20 automatically performs control to increase the ACC set vehicle speed of the own vehicle 100 (Step S14). Then, the ECU 20 ends the series of control.

As a result, since it is possible to prevent the own vehicle 100 from being separated from the preceding vehicle 110 and to maintain the platoon traveling, it is possible to improve the fuel consumption and electricity consumption of the own vehicle 100 by the wind-shielding effect.

Note that in the platoon traveling system according to the embodiment, the external sensors 37 provided in the own vehicle 100, such as the in-vehicle camera, the RADAR, and the LIDAR function as detection devices to detect the preceding vehicle. The relative speed between the own vehicle 100 and the preceding vehicle 110 can be acquired by utilization of a millimeter wave radar or the like, for example. In addition, the predetermined increase range of when the ACC set vehicle speed of the own vehicle 100 is increased is preferably +1 to 2 km with respect to the vehicle speed of the preceding vehicle 110, for example. In addition, in a case where the vehicle speed of the preceding vehicle 110 is higher than the ACC set vehicle speed of the own vehicle 100 for a predetermined speed or more (the preceding vehicle 110 is faster than the own vehicle 100 for +10 km/h or more), the ECU 20 does not change the ACC set vehicle speed of the own vehicle 100. As a result, it is possible to control deterioration in the fuel consumption and the electricity consumption due to an excessive increase in the ACC set vehicle speed of the own vehicle 100.

In addition, in a case where the ACC set vehicle speed of the own vehicle 100 is increased and exceeds a speed limit of the traveling lane in which the own vehicle 100 is traveling, the ECU 20 does not propose to increase the ACC set vehicle speed of the own vehicle 100 or automatically change the ACC set vehicle speed of the own vehicle 100. Furthermore, in a case where the vehicle speed of the preceding vehicle 110 exceeds a speed limit of either one of the preceding vehicle 110 or the own vehicle 100 in the traveling lane, the ECU 20 does not propose to increase the ACC set vehicle speed of the own vehicle 100, or automatically change the ACC set vehicle speed of the own vehicle 100. As a result, it is possible to control a shift to the platoon traveling exceeding the speed limit of either one of the preceding vehicle 110 or the own vehicle 100. Note that with respect to speed limit information of the traveling lane, for example, the speed limit information of the traveling lane on which the traveling is currently performed is acquired on the basis of the position information of the own vehicle 100 which information is received by the GPS receiving unit 38 and the map information in the map database 39, or is acquired from a speed sign by the in-vehicle camera.

A platoon traveling system according to the present disclosure has an effect that it is possible to shift to platoon traveling with a preceding vehicle having a high wind-shielding effect and to improve fuel consumption and electricity consumption of an own vehicle as compared with a case where the own vehicle continues to travel alone by adaptive cruise control.

According to an embodiment, it is possible to shift to platoon traveling with the preceding vehicle having the high wind-shielding effect and to improve fuel consumption and electricity consumption of the own vehicle as compared with a case where the own vehicle continues to travel alone by the adaptive cruise control.

According to an embodiment, it is possible to shift to the platoon traveling while preventing the own vehicle from rapidly approaching the preceding vehicle.

According to an embodiment, it is possible to control deterioration in the fuel consumption and the electricity consumption due to an excessive increase in the ACC set vehicle speed of the own vehicle.

According to an embodiment, it is possible to control a shift to the platoon traveling exceeding a speed limit of either one of the preceding vehicle or the own vehicle.

According to an embodiment, it is possible to determine whether the wind-shielding effect of the preceding vehicle is high.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A platoon traveling system comprising:
a control device that controls traveling of an own vehicle while performing adaptive cruise control that adjusts a vehicle speed of the own vehicle so that the own vehicle follows a preceding vehicle at a certain interval, the control device including an electronic control unit configured to:
in a case where (i) the preceding vehicle that is detected on a front side of the own vehicle by a detection device provided in the own vehicle while the own vehicle is traveling alone while performing the adaptive cruise control is determined by the electronic control unit to have a high wind-shielding effect, and (ii) a vehicle speed of the preceding vehicle is higher than an ACC set vehicle speed set as a vehicle speed in performing the adaptive cruise control of the own vehicle, the electronic control unit proposes to increase the ACC set vehicle speed of the own vehicle by a predetermined increase range to a passenger of the own vehicle by using a proposal device provided in the own vehicle, wherein
the electronic control unit (a) calculates a projected area, which is a back surface area, of the preceding vehicle based on an image of the preceding vehicle photographed from behind the preceding vehicle by a photographing device provided in the own vehicle, and (b) determines that the wind-shielding effect of the preceding vehicle is high when the projected area that has been calculated is equal to or larger than a predetermined value.

2. The platoon traveling system according to claim 1, wherein the electronic control unit does not propose to change the ACC set vehicle speed of the own vehicle in a case where the vehicle speed of the preceding vehicle is lower than the ACC set vehicle speed of the own vehicle.

3. The platoon traveling system according to claim 1, wherein the predetermined increase range is +1 to 2 km/h with respect to the vehicle speed of the preceding vehicle.

4. The platoon traveling system according to claim 1, wherein the electronic control unit does not propose to change the ACC set vehicle speed of the own vehicle in a case where the vehicle speed of the preceding vehicle is higher than the ACC set vehicle speed of the own vehicle by at least a predetermined speed.

5. The platoon traveling system according to claim 1, wherein the electronic control unit does not propose to change the ACC set vehicle speed of the own vehicle in a case where the vehicle speed of the preceding vehicle exceeds a speed limit of either one of (1) a travelling lane of the preceding vehicle or (2) a travelling lane of the own vehicle.

6. A platoon traveling system comprising:
a control device that controls traveling of an own vehicle while performing an adaptive cruise control that adjusts a vehicle speed of the own vehicle so that the own vehicle follows a preceding vehicle at a certain interval, the control device including an electronic control unit configured to:
in a case where (i) the preceding vehicle that is detected on a front side of the own vehicle by a detection device provided in the own vehicle while the own vehicle is traveling alone while performing the adaptive cruise control is determined by the electronic control unit to have a high wind-shielding effect, and (ii) a vehicle speed of the preceding vehicle is higher than an ACC set vehicle speed set as a vehicle speed in performing the adaptive cruise control of the own vehicle, the electronic control unit automatically executes control to increase the ACC set vehicle speed of the own vehicle by a predetermined increase range, wherein
the electronic control unit (a) calculates a projected area, which is a back surface area, of the preceding vehicle based on an image of the preceding vehicle photographed from behind the preceding vehicle by a photographing device provided in the own vehicle, and (b) determines that the wind-shielding effect of the preceding vehicle is high when the projected area that has been calculated is equal to or larger than a predetermined value.

7. The platoon traveling system according to claim 6, wherein the electronic control unit does not change the ACC set vehicle speed of the own vehicle in a case where the vehicle speed of the preceding vehicle is lower than the ACC set vehicle speed of the own vehicle.

8. The platoon traveling system according to claim 6, wherein the predetermined increase range is +1 to 2 km/h with respect to the vehicle speed of the preceding vehicle.

9. The platoon traveling system according to claim 6, wherein the electronic control unit does not change the ACC set vehicle speed of the own vehicle in a case where the vehicle speed of the preceding vehicle is higher than the ACC set vehicle speed of the own vehicle by at least a predetermined speed.

10. The platoon traveling system according to claim 6, wherein the electronic control unit does not change the ACC set vehicle speed of the own vehicle in a case where the vehicle speed of the preceding vehicle exceeds a speed limit of either one of (1) a travelling lane of the preceding vehicle or (2) a travelling lane of the own vehicle.

* * * * *